United States Patent [19]

Kusakabe et al.

[11] Patent Number: 5,161,444
[45] Date of Patent: Nov. 10, 1992

[54] TRAVELING PIPE CUTTER

[75] Inventors: Ryoji Kusakabe; Osamu Yokoyama, both of Kobe, Japan

[73] Assignee: Kusakabe Electric & Machinery Co. Ltd., Hyogo, Japan

[21] Appl. No.: 725,493

[22] Filed: Jul. 3, 1991

[30] Foreign Application Priority Data

Apr. 30, 1991 [JP] Japan ................ 3-98693

[51] Int. Cl.5 ............................ B23D 25/06
[52] U.S. Cl. ...................... 83/319; 83/320; 83/456; 83/519
[58] Field of Search ................ 83/318–320, 83/454–456, 382, 519, 51, 303

[56] References Cited

U.S. PATENT DOCUMENTS

| | | |
|---|---|---|
| 3,288,011 | 11/1966 | Borzym . |
| 3,288,012 | 11/1966 | Borzym . |
| 3,460,421 | 8/1969 | Borzym . |
| 4,109,555 | 8/1978 | Borzym . |
| 4,149,438 | 4/1979 | Hori . |
| 4,337,680 | 7/1982 | Borzym . |
| 4,354,409 | 10/1982 | Riera et al. . |
| 4,354,411 | 10/1982 | Griese et al. ............. 83/49 |
| 4,361,064 | 11/1982 | Sasaki . |
| 4,376,401 | 3/1983 | Borzym . |
| 4,385,538 | 5/1983 | Bieri et al. ............. 83/382 |
| 4,457,200 | 7/1984 | Borzym ............. 83/519 |
| 4,499,803 | 2/1985 | Borzym et al. . |
| 4,637,287 | 1/1987 | Kusakabe . |
| 4,762,039 | 8/1988 | Rimmele ............. 83/320 |
| 5,003,853 | 4/1991 | Borzym et al. ......... 83/318 |

Primary Examiner—Frank T. Yost
Assistant Examiner—Allan M. Schrock
Attorney, Agent, or Firm—Sterne, Kessler, Goldstein & Fox

[57] ABSTRACT

A traveling pipe cutter which includes an upper blade and a lower blade mounted on a blade holder such that the blade holder moves in response to a crank mechanism to cut the pipe with every one-cycle motion of the crank. The clamp which holds the pipe during the cutting process also serves as the blade guide for both the upper and lower blades.

8 Claims, 10 Drawing Sheets

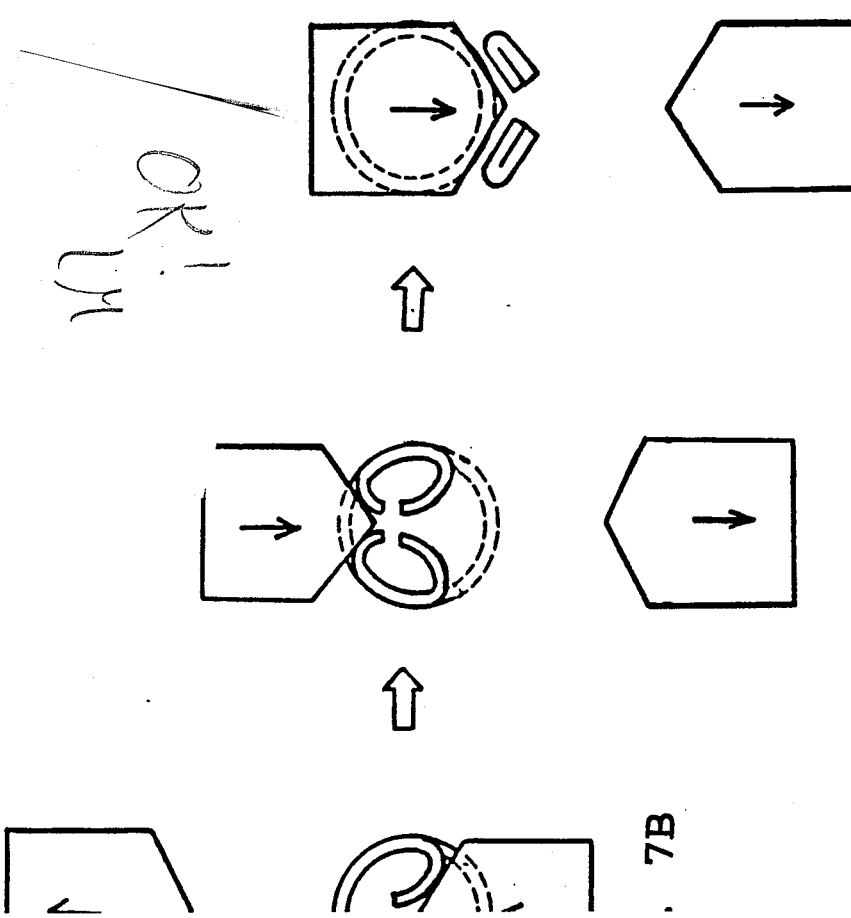

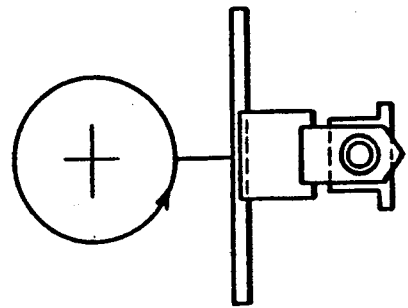
FIG. 10A
FIG. 10B
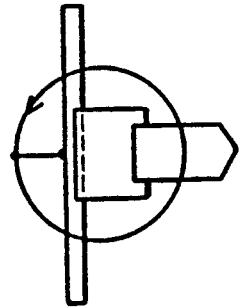
FIG. 10C
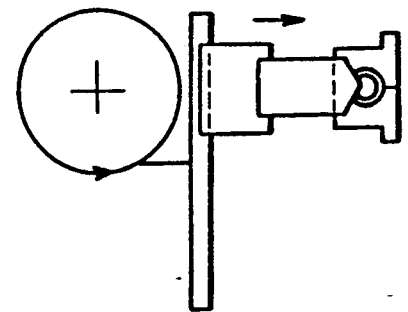
FIG. 10D
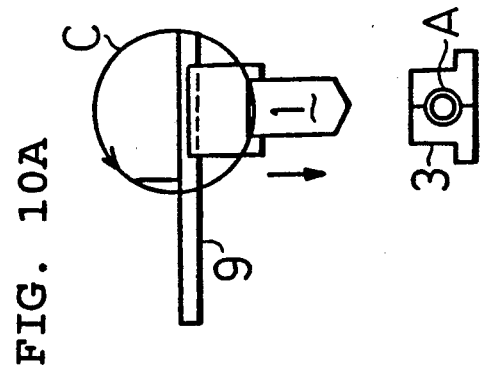
FIG. 10E
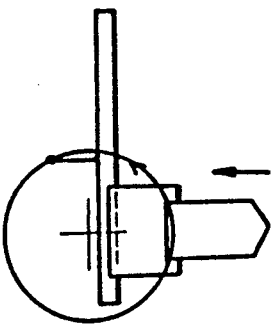
FIG. 10F
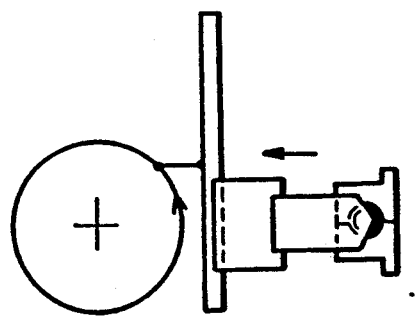

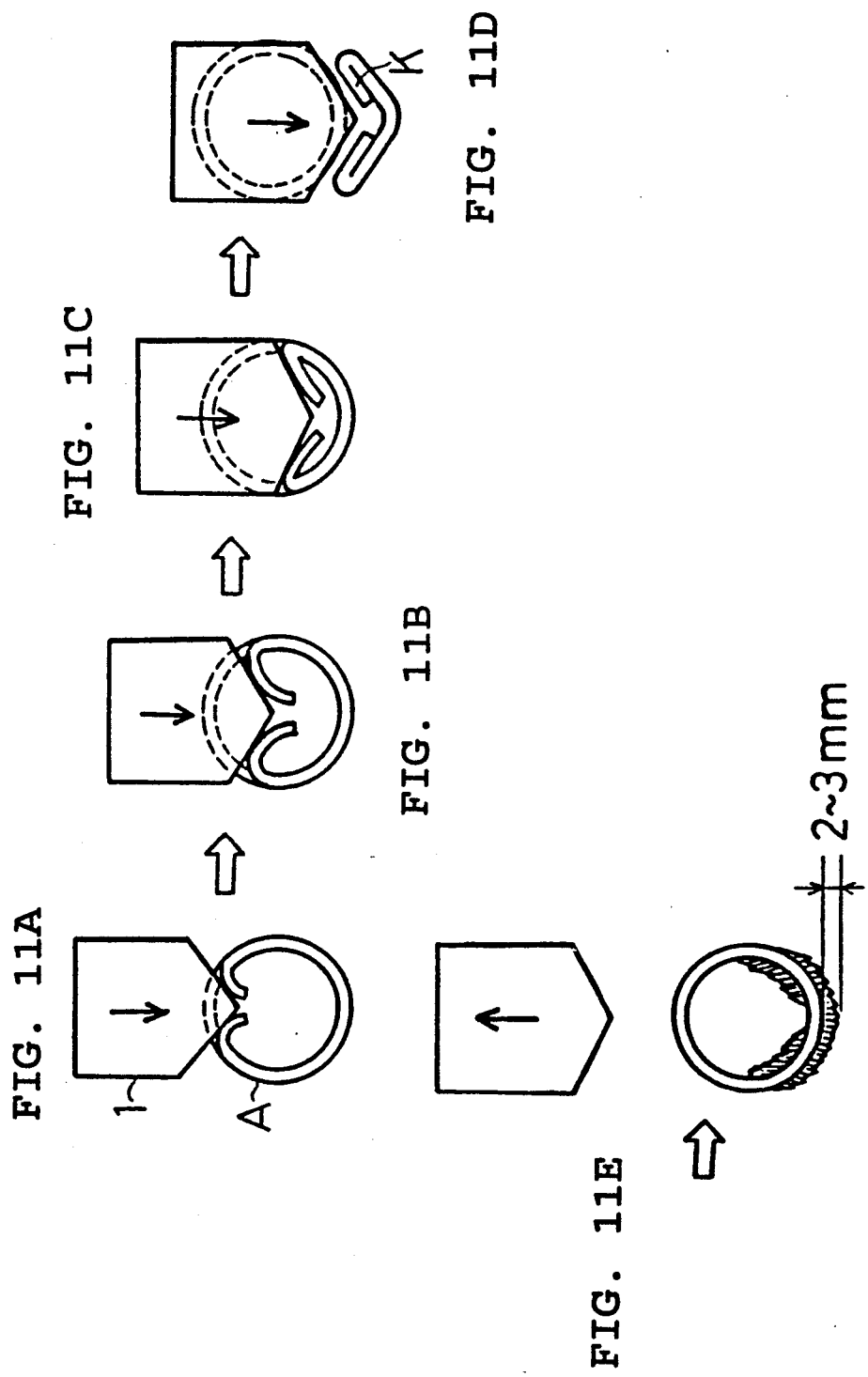

TRAVELING PIPE CUTTER

FIELD OF THE INVENTION

The present invention relates to an improvement in a traveling pipe cutter for cutting in a predetermined length a metal pipe circular or angular in section in a process of continuously producing the pipe.

PRIOR ART

Such pipe cutting by use of traveling pipe cutter is well known by the U.S. Pat. Nos. 4,637,287 and 2,879,844 and West German Patent No. 2421392. A blade of the conventional pipe cutter as shown in the above prior art is so constructed that, as shown in FIG. 10, an upper blade 1 of downwardly orienting press blade is positioned above a clamp 3 used also as a basic blade or blade guide and for holding a pipe to be cut and operates to cut the pipe in the entire cross section thereof by one-cycle operation of a crank mechanism.

SUMMARY OF THE INVENTION

When the cutting work is carried out according to the above-mentioned conventional technique, as shown in FIG. 11, a chip K is produced as a pipe A is cut, so that the upper blade 1 proceeds to directly cut an upper half of pipe A in section and for a lower half thereof the produced chip K is interposed between the upper blade 1 and the pipe A while cutting.

Accordingly, in the first half of the cutting process, the blade is sharp so that a cutting load is small enough and the cut surface is smooth, but, in the latter half, the blade becomes dull due to the chip interposed between the blade and the pipe, so that the cutting load increases to produce burrs at the cut surface, the burrs, for example, when a pipe circular in section and of 114.3 mm in outer diameter and of 6 mm in thickness is cut, are sharp and of 2 to 3 mm in height and produced at the inside and outside of the pipe. When using the pipe for various objects, the burrs are harmful, thereby creating the inconvenience that the burrs must previously be removed.

BRIEF DESCRIPTION OF THE DRAWINGS

FIG. 7 shows the state of the cut surface of a cut pipe A in the process of cutting, FIG. 10 shows the relation between an upper blade 1 and a crank mechanism C in the prior art, and FIG. 11 shows the state of the cut surface of the cut pipe A in the prior art.

DESCRIPTION OF THE PREFERRED EMBODIMENT

Next, an embodiment of the present invention will be described in accordance with the accompanying drawings.

Figure 1:
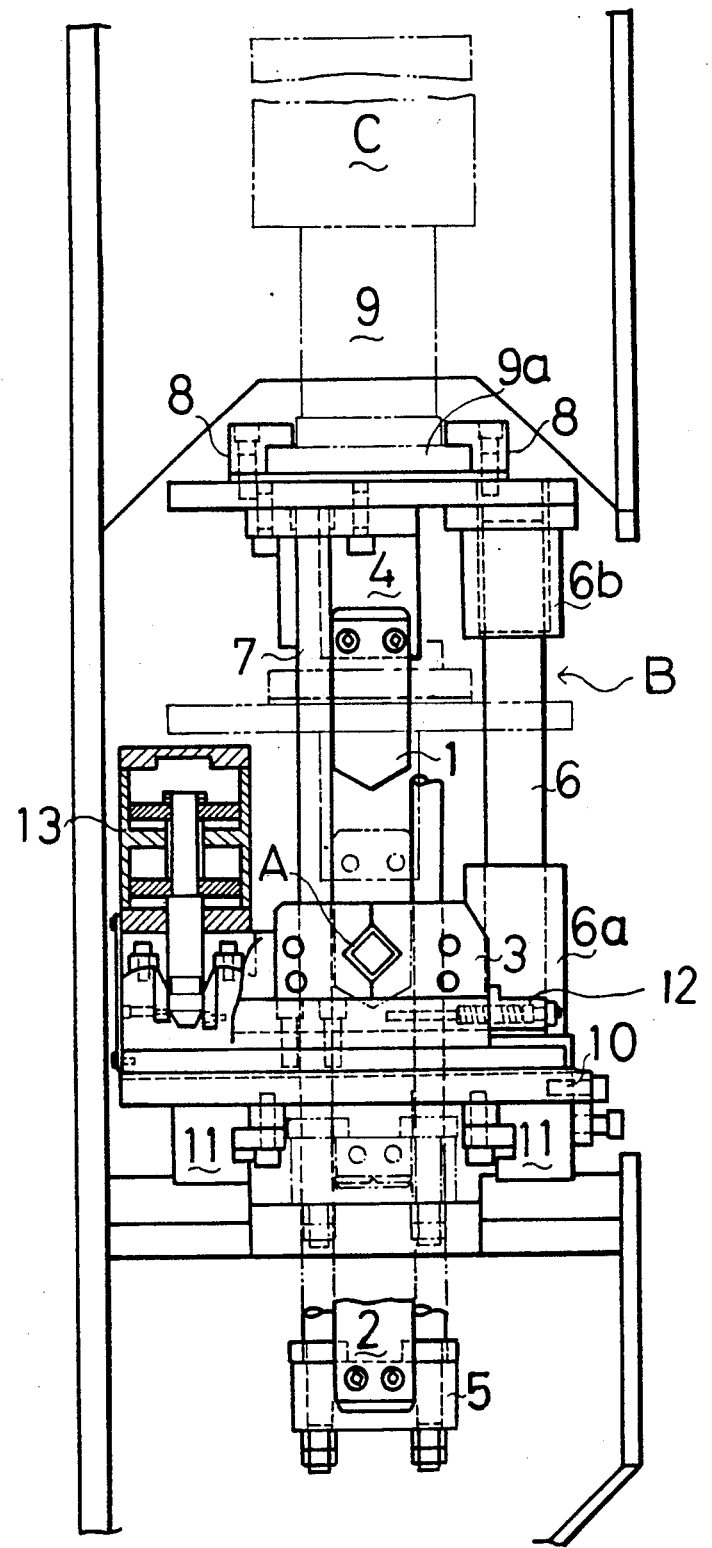
FIG. 1 is a front view of a pipe cutter.

FIG. 1 is a front view of entire construction of a pipe cutter of the present invention. Clamping guides 8 attached to the upper end of a blade holder B clamp therebetween a ram rail 9a of a ram 9 of part of a crank mechanism so that the vertical movement of the cranked ram 9 is transmitted to the blade holder B, whereby the blade holder B vertically moves. Since the entire blade holder B longitudinally slides, the cutter travels while vertically moving the upper and lower blades 1 and 2. Such operation allows the upper blade 1 and lower blade 2 to alternately cut a pipe A clamped by a clamp 3 used also as a basic blade or blade guide.

Figure 2:
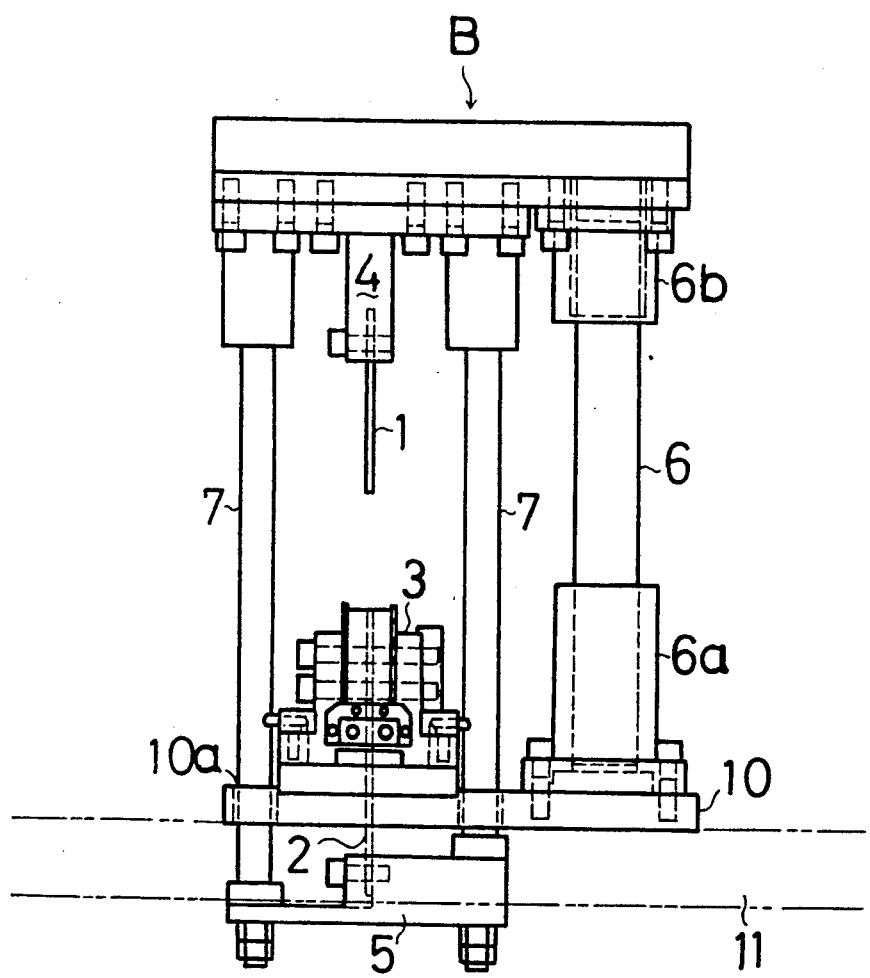
FIG. 2 is a side view thereof.

FIG. 2 is a side view of the pipe cutter. Next, explanation will be given on construction of the pipe cutter comprising the blade holder B and clamp 3 used also as the basic blade or blade guide according to FIGS. 1 and 2. The upper and lower ends of blade holder B are connected by four upper and lower holder connecting rods 7, which are inserted rod bores 10a provided at a clamp table 10 and vertically slidably movable by rotation of the crank respectively.

To the upper portion and lower portion of blade holder B are attache an upper-blade holder 4 and a lower-blade holder 5, to which the upper and lower blades 1 and 2 are mounted respectively. A guide rod 6 is inserted at the lower portion thereof into guide bush metal 6a, fixed at the lower end onto the clamp table 10, and inserted at the upper portion into a guide sleeve 6b, thereby allowing the blade holder B to slidably vertically move.

The clamp 3 used also as the basic blade or blade guide and fixed onto the clamp table 10 is provided with a clamp holding spring 12 and a clamp releasing pneumatic device 13, which operate to allow the clamp 3 to clamp and release the pipe A to be cut.

As shown in FIGS. 1 and 2, the pipe cutter is configured on rails 11, located between the lower portions of clamp table 10. As the pipe A is continuously fed in one direction, the pipe cutter moves along the rails 11 in the opposite or backward direction at the same speed at which the pipe A is being fed to perform the cut. When a cut of the pipe is to be made, the pipe A is first clamped by clamp 3. Then the pipe cutter moves backward along rails 11 and cuts the pipe by lower blade 2 and upper blade 1. The pipe is then released from clamp 3, and the pipe cutter moves forward (in the same direction in which the pipe is being fed) to clamp the pipe A to perform the next cut.

Next, explanation will be given on the cutting process of the pipe A to be cut by the upper and lower blades 1 and 2.

Figure 3:
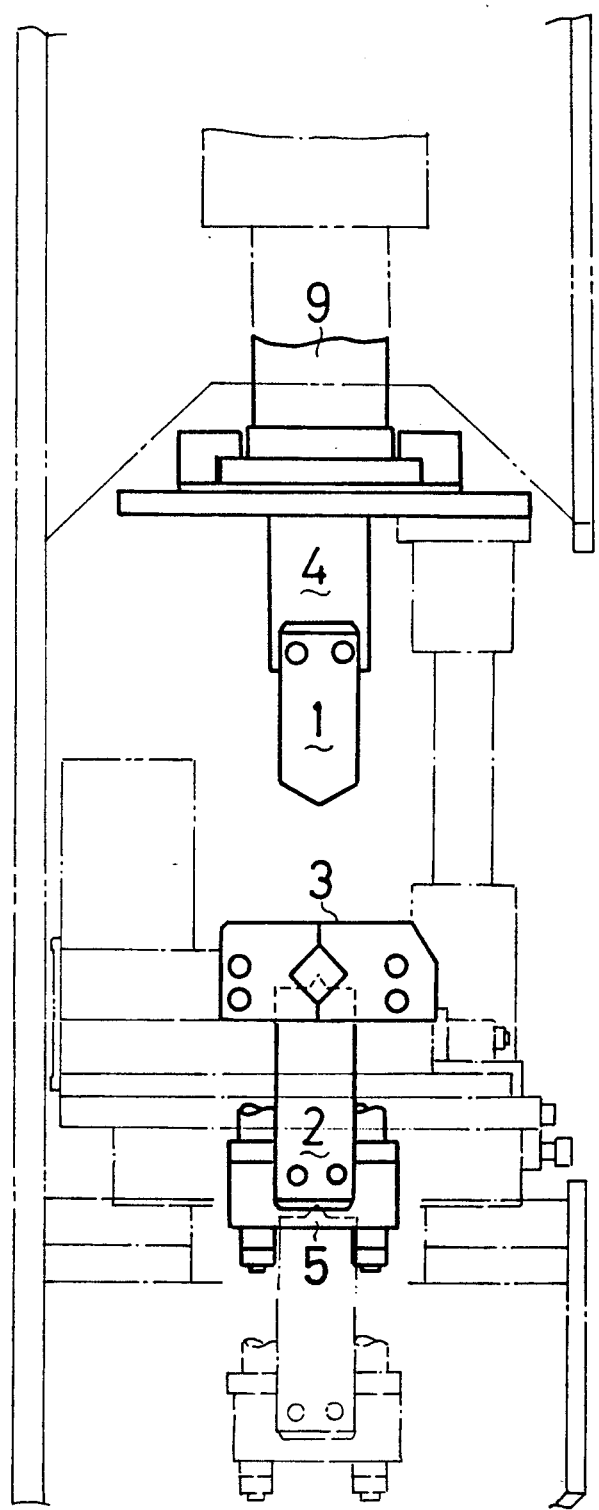
FIG. 3 is a front view showing the cutting state by a lower blade 2.
Figure 4:
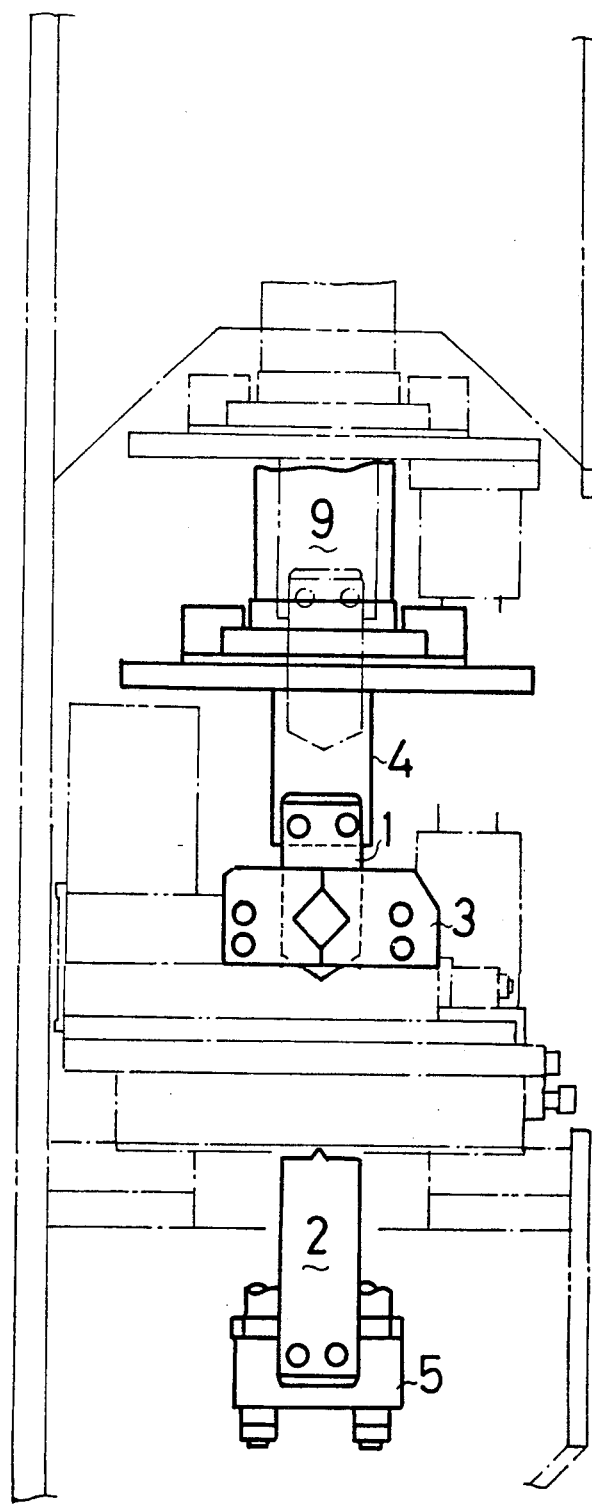
FIG. 4 is a front view showing the cutting state by an upper blade 2.

FIG. 3 is a front view showing the state where the pipe A is cut by the lower blade 2, FIG. 4 is a front view where the same is cut by the upper blade 1, and FIGS. 5 and 6 show the relation between the operation of crank mechanism C and that of blade holder B.

Referring to FIG. 5-(1), the first state of cutting process is shown, at which time the clamp 3 used also as the basic blade or blade guide closes to clamp the pipe A to be cut. The ram 9 hanging from the crank mechanism C starts to lift as the crank mechanism C operates and the entire blade holder B rises following the ram 9, and then, as shown in FIG. 5-(2), the ram 9 reaches the upper dead point, and at this time point the lower blade 2 ends cutting of the lower half of pipe A. FIG. 3 shows the positions of the upper blade 1 and lower blade 2 at this time.

Next, as shown in FIG. 5-(3), the crank mechanism C rotates to lower the ram 9 and blade holder B and then, as shown in FIG. 6-(4), the upper blade 1 cuts the upper half of pipe A. The ram 9 reaches the lower dead point as shown in FIG. 6-(5), and the entire cross section of pipe A is completely cut by the upper blade 1, at which time the positions of upper blade 1 and lower blade 2 are shown in FIG. 4.

Lastly, at the state as shown in FIG. 6-(6), the crank mechanism C ends its one-cycle operation and stops, the clamp 3 is released, the pipe A having been cut is sent out, and then the pipe cutter stands by until the next cutting work. In addition, in the states from FIG. 5-(1) to FIG. 6-(6), the blade holder B and clamp 3 backwardly slidably move following movement of the pipe A to be cut and, after the state shown in FIG. 6-(6), again forwardly return to be in the state shown in FIG. 5-(1). As shown in FIGS. 5 and 6, ram 9 is moving transversely while blade holder B is moving vertically during the cutting operation.

FIG. 7 shows the state of the cross-section of the pipe A to be cut in the cutting process. In the prior art shown in FIG. 10, a cutting chip is interposed between the pipe and the blade as shown in FIG. 11 and burrs are produced as shown in FIG. 11-(5), but in the present invention, the lower blade 2 cuts the lower half of pipe A and the upper blade 1 directly cuts the upper half of the same, whereby no burr is produced and the cross-section of pipe A is smooth and the cutting load is small enough.

Figure 8:
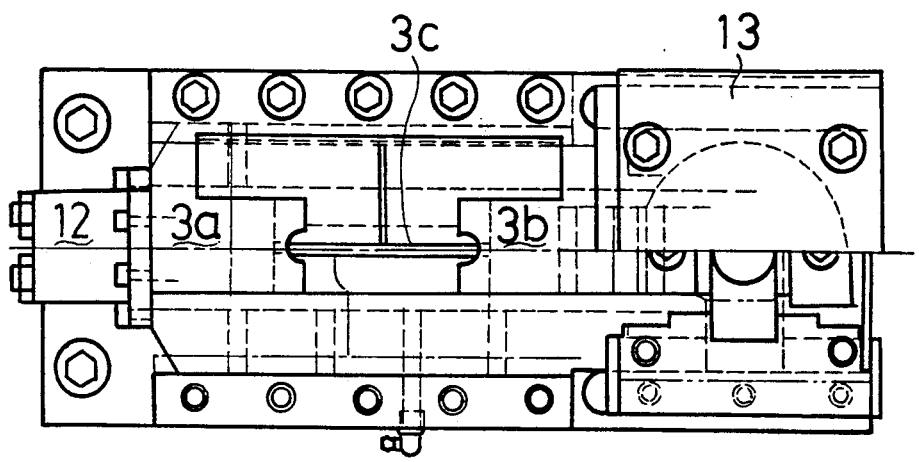
FIG. 8 is a top view of a clamp 3 used also as a basic blade.
Figure 9:
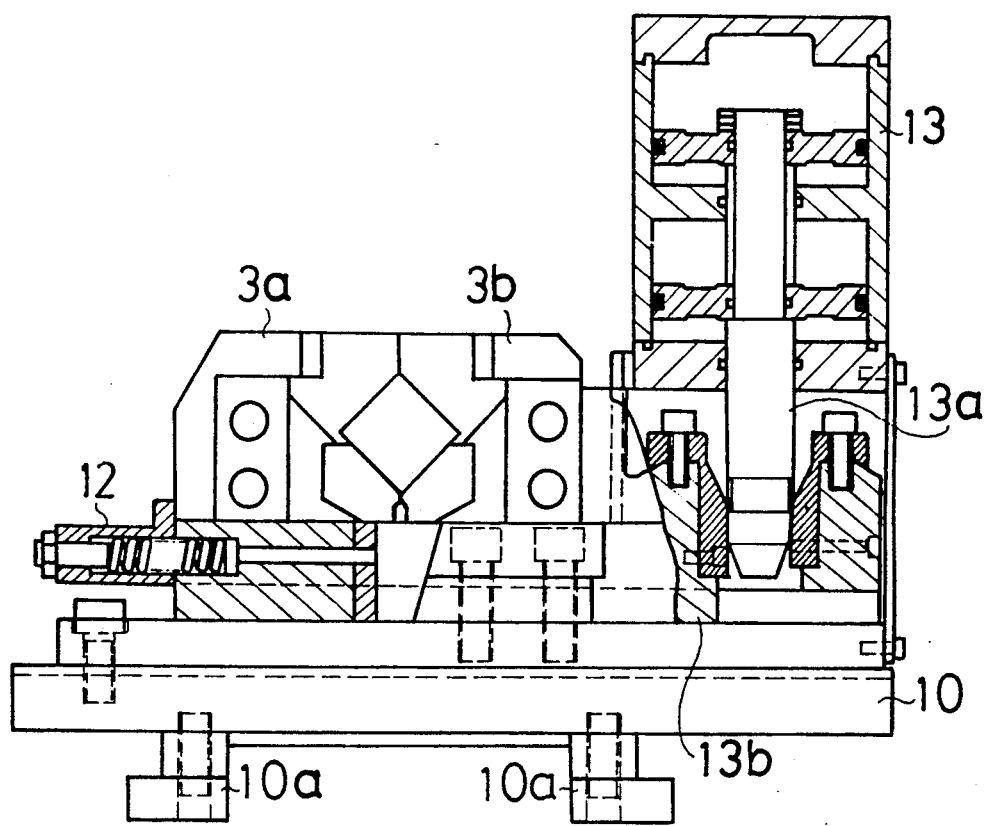
FIG. 9 is a front view of the clamp 3 fixed onto a clamp 10.

FIG. 8 is a top view of the clamp 3 used also as the basic blade or blade guide, which is provided with a clamp holding spring 12 and a clamp open-close pneumatic device 13. FIG. 9 is a front view of the clamp 3 fixed onto a clamp table 10. In the clamp 3 used also as the basic blade or blade guide, basic blades or blade guides 3a and 3b are parts for putting therebetween the pipe A to be cut and, during the cutting work, serve as the guide for blades. As shown in FIG. 8, a groove 3c is provided between guides 3a and 3b into which the upper and lower blades 1 and 2 are insertable. The clamp 3 is released in such a manner that the clamp open-close pneumatic device 13 operates to lower a piston 13a by pneumatics so as to laterally widen a clamp connecting unit 13b so that the blade guide 3a in association therewith is laterally widened.

The piston 13a rises by pneumatics, a spring force of a clamp holding spring 12 is applied on the clamp connecting unit 13b, and the basic blade guide 3a is pushed to return, thereby closing the clamp 3. In addition, to the lower surface of clamp table 10 are attached rail holders 10a and lower projections thereof are fitted into U-like-shaped grooves at the insides of rails 11, thereby enabling the clamp table 10 to be slidable on the rails 11. Of course an interval between both the left and right holders 10a is wide enough to fit the lower blade holder 5 therebetween FIGS. 1 through 4, 8 and 9 show the clamp used also us a blade guide when cutting the pipe angular in cross section, and FIGS. 5 through 7 show the same when cutting the pipe circular in cross section.

The present invention constructed as the above-mentioned is effective as follows: When cutting the pipe A to be cut, the blade is always kept sharp, the cutting load is small, no burr is produced at the cut surface, and the cut surface is ensured to be smooth, thereby saving labor to remove the burr. In the prior art, cutting chips are produced as the pipe A is cut. The upper blade 1 proceeds to directly cut the upper half of cross-section of the pipe, but, when the lower half is cut, the produced chips K are interposed between the upper blade 1 and the pipe. Accordingly, in the first half of cutting process, the blade is sharp, the cutting load is small enough, and the cut surface is smooth, but in the latter half, the blade becomes dull because of chips interposed between the blade and the pipe, whereby there is inconvenience such that the cutting load becomes larger and burrs are produced at the cut surface. The existence of burr is harmful when the pipe is used for various purposes, whereby it is inconvenient that the burr must be removed prior to the use of the cut pipe. However, the present invention of the above-mentioned construction can reduce production of burr, whereby the inconvenience in the prior art can be eliminated.

What is claimed is:

1. A pipe cutter, comprising:
   a blade holder, said blade holder including an upper blade holder and a lower blade holder;
   a connecting rod for connecting said upper blade holder and said lower blade holder;
   an upper severing blade disposed in said upper blade holder above the pipe to be cut;
   a lower severing blade disposed in said lower blade holder below the pipe to be cut;
   a clamp for holding the pipe to be cut, said clamp fixedly disposed above said lower blade and below said upper blade; and
   a groove disposed within said clamp through which said upper blade and said lower blade move vertically when cutting said pipe.

2. A pipe cutter according to claim 1, wherein said blade holder is positioned such that the pipe is completely cut by said upper blade.

3. A pipe cutter comprising:
   a blade holder;
   an upper severing blade disposed in said blade holder above the pipe to be cut;
   a lower severing blade disposed in said blade holder below the pipe to be cut;
   means for vertically moving said blade holder, said means including a ram and a rotating crank; and
   wherein said pipe is completely cut by said upper blade by rotating said crank 360°.

4. A pipe cutter according to claim 3, further comprising a clamp for holding the pipe to be cut.

5. A pipe cutter according to claim 4, further comprising a grove disposed within said clamp through which said upper blade and said lower blade move vertically when cutting said pipe.

6. A pipe cutter, comprising:
   a blade holder;
   an upper severing blade disposed in said blade holder above the pipe to be cut;
   a lower severing blade disposed in said blade holder below the pipe to be cut;
   means for vertically moving said blade holder, said means including a ram and a rotating crank;
   a clamp for holding the pipe to be cut; and
   a groove disposed within said clamp through which said upper blade and said lower blade move vertically when cutting said pipe.

7. A pipe cutter according to claim 6, wherein said pipe is completely cut by rotating said crank 360°.

8. A pipe cutter according to claim 6, wherein said means for vertically moving said blade holder moves said blade holder such that said pipe is completely cut by said upper blade.

* * * * *

UNITED STATES PATENT AND TRADEMARK OFFICE
CERTIFICATE OF CORRECTION

PATENT NO. : 5,161,444

DATED : November 10, 1992

INVENTOR(S) : Kusakabe et al.

Figure 5C:
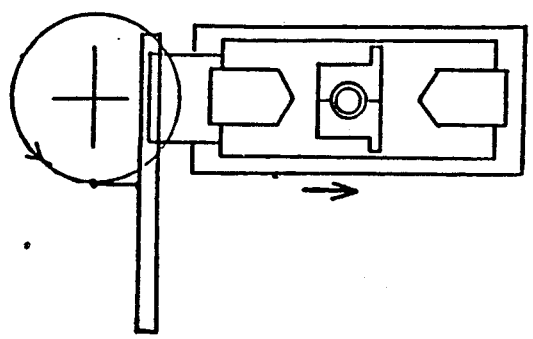
FIG. 5 shows the relation between a blade holder B and a crank mechanism C.
Figure 5B:
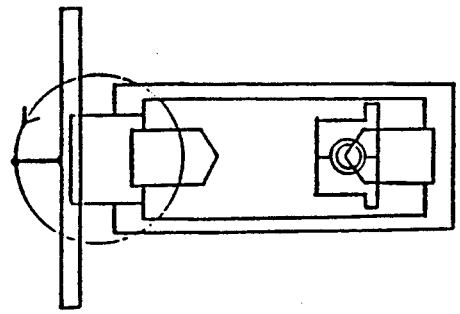
Figure 5A:
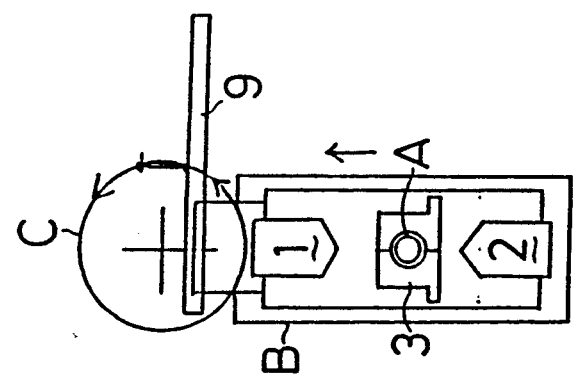
Figure 6C:
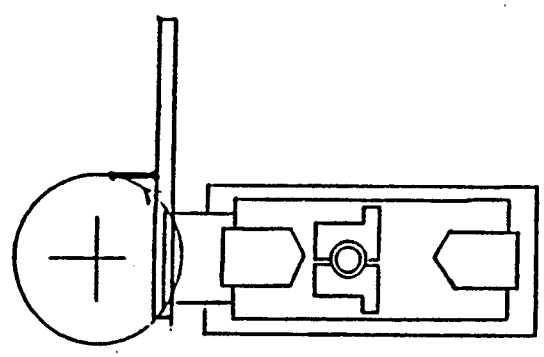
FIG. 6 shows the relation therebetween.
Figure 6B:
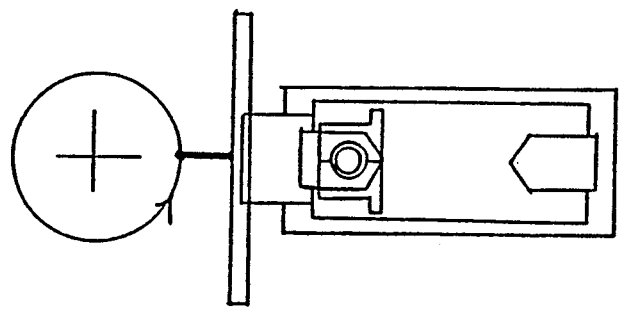
Figure 6A:
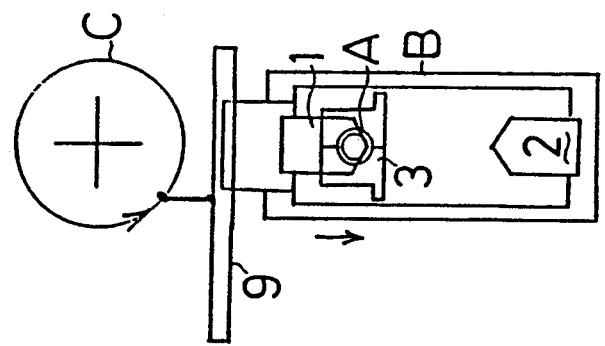

It is certified that error appears in the above-identified patent and that said Letters Patent is hereby corrected as shown below:

Column 1, lines 17 and 18, delete "FIG. 10" and insert --FIGS. 10A - 10F-- therefor; line 27, delete "FIG. 11" and insert --FIGS. 11A - 11E-- therefor; line 55, delete "FIG. 5 shows" and insert --FIGS. 5A - 5C show-- therefor; line 57, delete "FIG. 6 shows" and insert --FIGS. 6A - 6C show-- therefor; line 58, delete "FIG. 7 shows" and insert --FIGS. 7A - 7D show-- therefor; line 64, delete "FIG. 10 shows" and insert --FIGS. 10A - 10F show-- therefor; and line 66, delete "FIG. 11 shows" and insert --FIGS. 11A - 11E show-- therefor.

Column 2, line 61, delete "5 and 6" and insert --5A - 5C and 6A - 6C-- therefor; and line 63, delete "5-(1)" and insert --5A-- therefor.

UNITED STATES PATENT AND TRADEMARK OFFICE
CERTIFICATE OF CORRECTION

PATENT NO. : 5,161,444

DATED : November 10, 1992

INVENTOR(S) : Kusakabe et al.

It is certified that error appears in the above-identified patent and that said Letters Patent is hereby corrected as shown below: In the drawings, sheet 7 should also include the following FIGS. 7A and 7B:

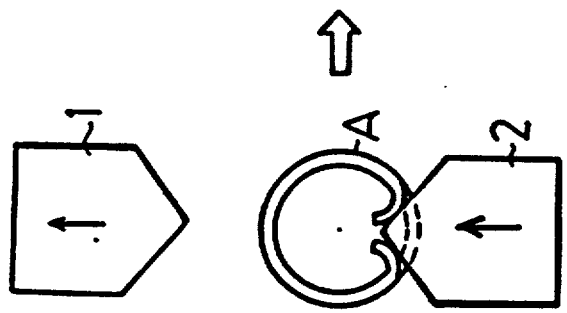

FIG. 7A

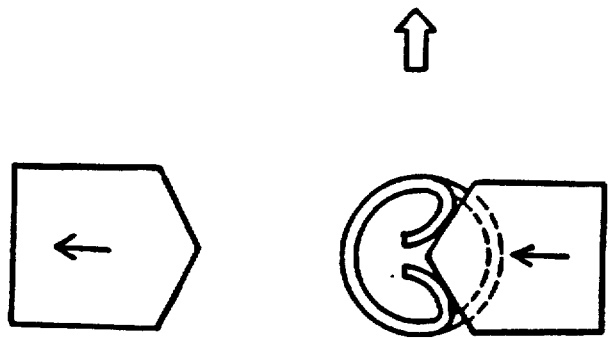

FIG. 7B

UNITED STATES PATENT AND TRADEMARK OFFICE
CERTIFICATE OF CORRECTION

PATENT NO. : 5,161,444
DATED : November 10, 1992
INVENTOR(S) : Kusakabe et al.

It is certified that error appears in the above-identified patent and that said Letters Patent is hereby corrected as shown below:

Column 3, line 1, delete "5-(2)" and insert --5B-- therefor; line 6, delete "5-(3)" and insert --5C-- therefor; line 8, delete "6-(4)" and insert --6A-- therefor; line 10, delete "6-(5)" and insert --6B-- therefor; lines 14, 19 and 21, delete "6-(6)" and insert --6C-- in each instance therefor; lines 18, 22 and 23, delete "FIG. 5-(1)" and insert --FIGS. 5A - 5C-- in each instance therefor; line 23, delete "5 and 6" and insert --5A - 5C and 6A - 6C-- therefor; line 26, delete "FIG. 7 shows" and insert --FIGS. 7A - 7D show-- therefor; line 28, delete "FIG. 10" and insert --FIGS. 10A - 10F-- therefor; line 29, delete "FIG. 11" and insert --FIGS. 11A - 11E-- therefor; and line 30, delete "11-(5)" and insert --11E-- therefor.

Signed and Sealed this

Eleventh Day of January, 1994

Attest:

BRUCE LEHMAN

*Attesting Officer*    *Commissioner of Patents and Trademarks*